Nov. 19, 1957  E. W. MOUER  2,813,385
SELF-ALIGNING LOCATOR PIN
Filed April 5, 1955  3 Sheets-Sheet 1

INVENTOR
*EARL W. MOUER*
BY
ATTORNEYS

Nov. 19, 1957 — E. W. MOUER — 2,813,385
SELF-ALIGNING LOCATOR PIN
Filed April 5, 1955 — 3 Sheets-Sheet 2

INVENTOR
EARL W. MOUER

ATTORNEYS

Nov. 19, 1957 E. W. MOUER 2,813,385
SELF-ALIGNING LOCATOR PIN

Filed April 5, 1955 3 Sheets-Sheet 3

INVENTOR
EARL W. MOUER

BY Mason, Porter, Miller & Stewart

ATTORNEYS

United States Patent Office 2,813,385
Patented Nov. 19, 1957

2,813,385

SELF-ALIGNING LOCATOR PIN

Earl W. Mouer, Waynesboro, Pa., assignor to Landis Tool Company, Waynesboro, Pa.

Application April 5, 1955, Serial No. 499,408

9 Claims. (Cl. 51—237)

The invention relates to new and useful improvements in the indexing mechanism of a crank pin grinding machine of the general type shown in the patent granted Hugh N. Rocks, September 15, 1953, No. 2,651,895. In a machine of this type the crank supporting members or heads have rotatable spindles provided with clamping fixtures having eccentrically located bearings in which the crank shaft is mounted with the axis of the crank shaft spaced from the axis of rotation of the head stock a distance equal to the distance between the axis of the crank shaft and the axes of the crank pins. The rotatable head stock is provided with an indexing mechanism for turning the crank shaft in its bearings or simply an index plate to position a crank manually when released from its clamping means for placing a selected crank pin in position for grinding. The indexing mechanism disclosed in the Rocks patent includes an indexing shaft carrying a head on which is rigidly fixed a locating pin adapted to engage a locating aperture in a flange member on the end of the crank shaft. The operator sometimes finds the aperture in the flange slightly out of proper position relative to the axis of the crank shaft. When the pin engages the aperture, the shaft does not rest solidly in its bearing and when clamped in this position is forced out of index. After grinding the crank is defective and may have to be reground or scrapped.

An object of the present invention is to provide the indexing mechanism for a machine of the above type with locating pins adapted to engage apertures in the flanged head on the crank shaft which pins are so mounted that they may shift to a limited extent on the head for entrance into the apertures when the apertures are slightly displaced from a proper position relative to the axis of the crank shaft.

A further object of the invention is to provide an indexing mechanism of the above type wherein the indexing shaft is provided with a head between which head and the flanged end of the crank shaft is a disc adapted to shift radially on the head to a limited extent and wherein said disc is provided with independent slides movable radially to a limited extent in a direction at right angles to the shiftable movement of the disc and wherein each slide is provided with a pin having a tapered end which when entered into a slightly misaligned aperture will cause the pin to shift into alignment with the aperture for entrance into the same.

A still further object of the invention is to provide an indexing mechanism of the above type wherein the indexing shaft is provided with a cylindrical projecting member having locating notches adapted to receive a locating pin when the axis of a crank pin selected for grinding has been moved into alignment with the axis of rotation of the headstock.

A still further object of the invention is to provide an indexing mechanism of the above type wherein the head on the end of the indexing shaft is formed in two sections, the inner section being rigidly secured to the indexing shaft for rotation therewith and the outer section, which is connected to the discs carrying the indexing pins, is mounted on the inner section and is shiftable circumferentially thereon to different set positions for properly positioning said pins relative to said indexing notches.

These and other objects will in part be obvious and will in part be hereinafter more fully disclosed.

Figure 1:
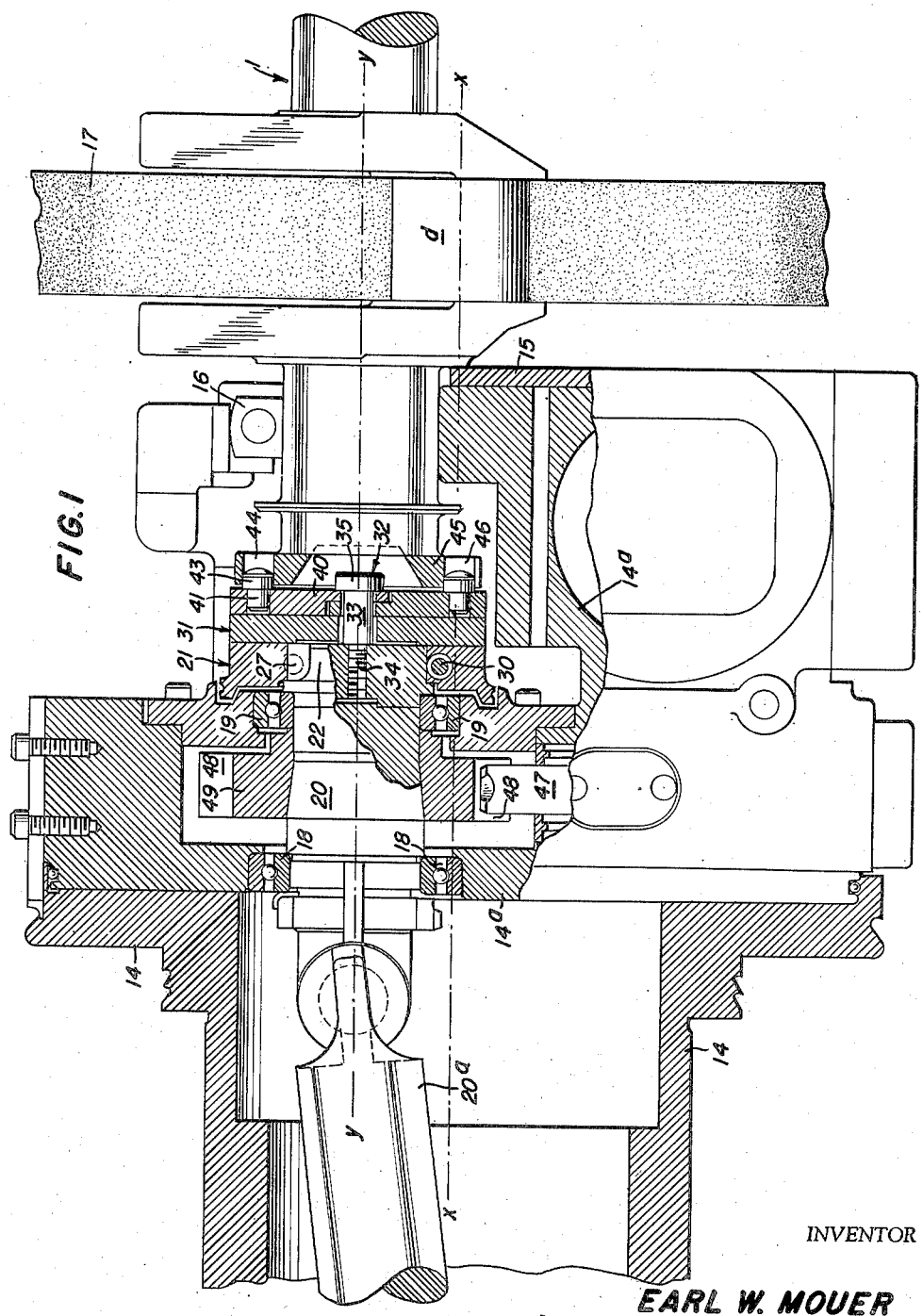
Figure 1 is a longitudinal sectional view through a portion of the head stock showing the indexing mechanism located therein, the supporting member for the crank shaft and the clamping member for clamping the crank shaft in its bearing; also showing the improved connection between the indexing shaft and the crank shaft.

The invention is employed in a crank pin grinding machine of the type shown in Patent 2,651,895, supra. Some of the essential features of the machine have been illustrated in the drawings and will be described in detail.

Figure 6:
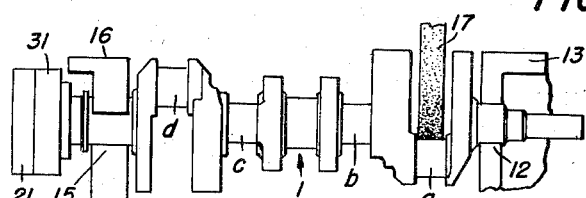
Figure 6 is a diagrammatic view on a small scale showing a crank shaft with four crank pins, a portion of the head and tail stocks with the shaft mounted thereon for the grinding of one of the crank pins and a portion of the grinding wheel for grinding the positioned crank.

In Figure 6 of the drawings a crank shaft 1 is shown having four crank pins *a*, *b*, *c* and *d* which are to be ground. The machine includes head and tail stocks in which are mounted rotating spindles. Mounted on the spindles are bearings for supporting the crank shaft to be ground in offset relation to the axes of the spindles. In Figure 6 a bearing associated with the tail stock spindle is indicated at 12 and the clamping member cooperating therewith at 13. The bearing carried by the spindle associated with the head stock is indicated at 15 and the clamping member cooperating therewith at 16. The crank shaft is only rotated in the bearings 12 and 15 for indexing to position a selected crank pin in axial alignment with the axes of the spindles for grinding. The crank pin *a* is shown in this Figure 6 as positioned for grinding with a portion of the grinding wheel 17 in engagement therewith. All these parts generally are present in the Patent 2,651,895 supra and further detailed description thereof is not thought necessary.

The head stock spindle 14 is hollow and is mounted in suitable bearings for rotation. It is rotated by a motor or any other suitable device. The head stock spindle has a supporting frame structure 14a in which is mounted the U-shaped bearing 15. This bearing opens upwardly and the operator places the shaft in the bearing. After it is properly positioned and connected up to an indexing mechanism, it is then clamped by the clamping device 16.

The head stock spindle rotates about an axis indicated by the line *x*—*x* which is in alignment with the axis of the crank pin *a*. After the shaft has been clamped to the head stock spindle then the spindle is rotated and the bearing, clamping device and the crank shaft are bodily rotated about the axis x—x of the head stock spindle.

Mounted in the ball bearings 18 and 19 carried by the frame structure 14ª of the head stock spindle 14 is an indexing shaft 20. The axis y—y of this indexing shaft is set eccentric to the axis of the rotating head stock spindle and on the axial line of the crank shaft clamped in the bearing 15. A shaft 20ª is connected to the shaft 20 by a universal joint and serves as a means for turning the shaft 20 for indexing.

Figure 2:
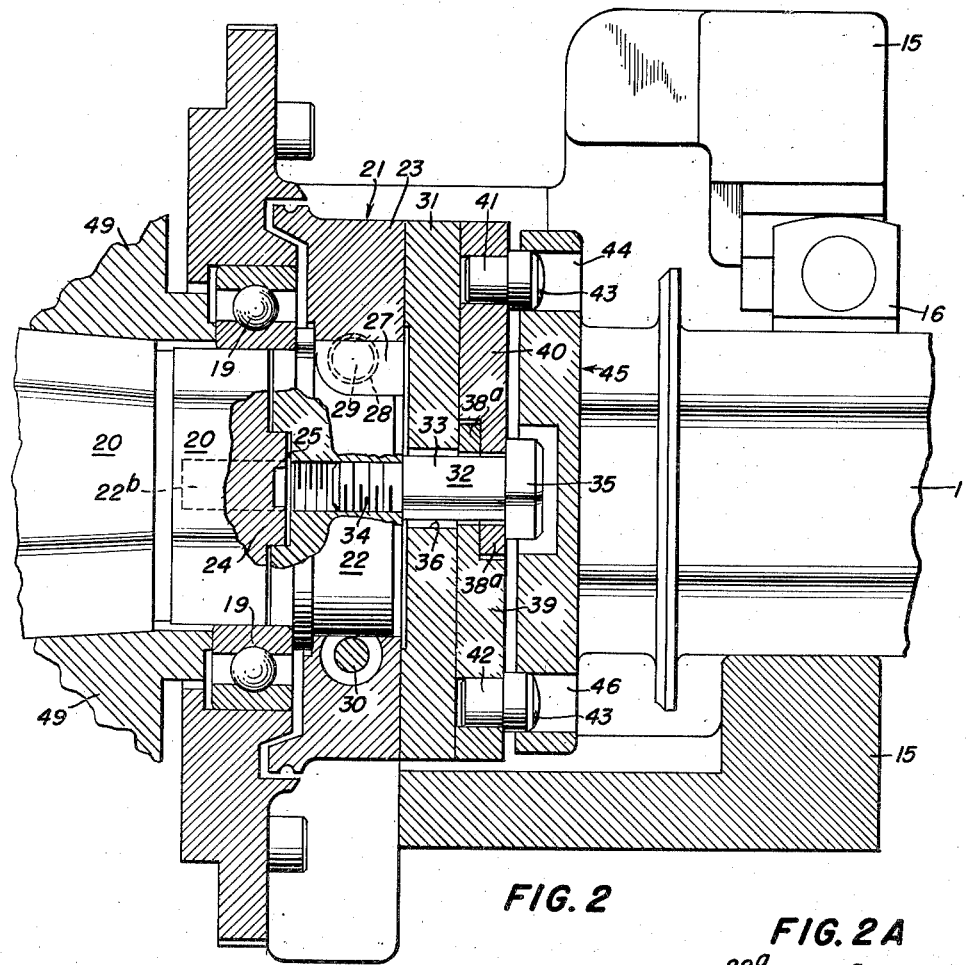
Figure 2 is a view on an enlarged scale showing the essential features of the connection between the indexing shaft and the crank shaft whereby the shaft when released from the clamping means may be turned to bring a crank pin into proper alignment with the axis of the head stock for the grinding of the same.
Figure 2A:
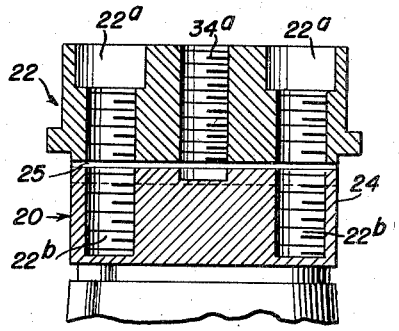
Figure 2a is a sectional view showing the connection of the inner member of the head to indexing shaft.
Figure 3:
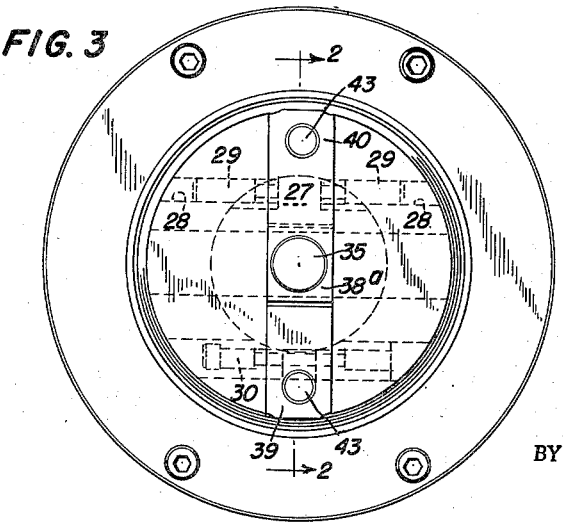
Figure 3 is an enlarged end elevation of the indexing mechanism.

Mounted at the end of the indexing shaft is an actuating head 21. This head is made in two sections. There is a central section 22, and an outer section 23. The central section 22 is rigidly attached to the end of the indexing shaft 20 by suitable bolts (not shown) passing through the openings 22ª, 22ª in the section 22 and threaded into openings 22ᵇ, 22ᵇ in the end of the shaft 20. See Figure 2ª. The openings 22ª, 22ª have inset shoulders engaged by the heads of the bolts, so that the head ends of the bolts do not project beyond the outer face of the section 22. On the outer end of the indexing shaft 20 is a rib 24. Said rib extends diametrically across the shaft 20 and engages a recess 25 in the inner face of the section 22. This rib connection between the end of the indexing shaft 20 and the section 22 insures positive rotation of the indexing devices and assists in holding the crank shaft in an indexed position during the grinding of a crank pin.

Figure 4:
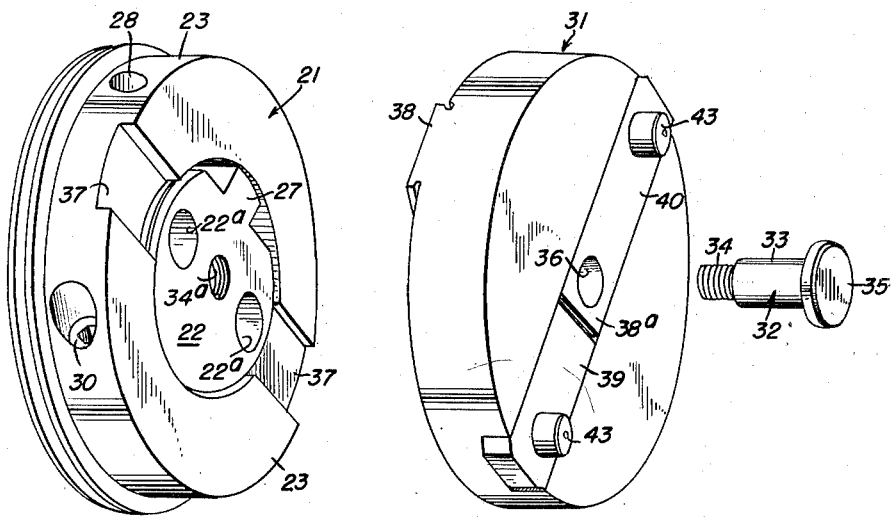
Figure 4 is a view in perspective showing the head and the shiftable disc separated from each other and positioned for proper assembly.
Figure 5:
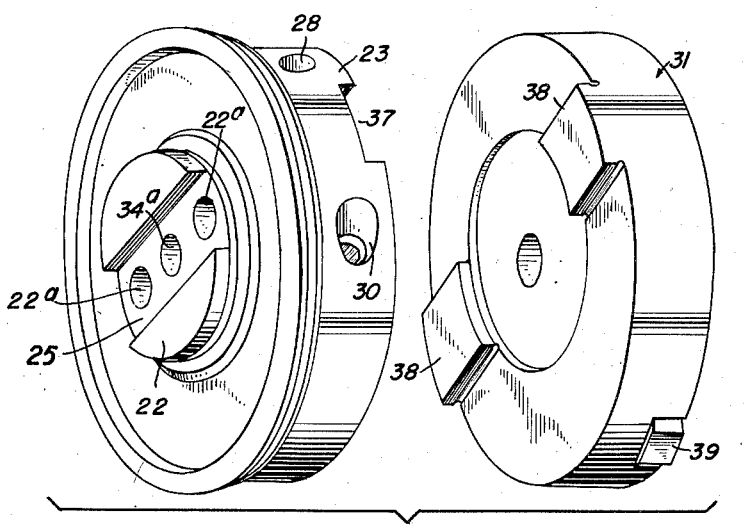
Figure 5 is a perspective view of a head and disc showing the parts positioned for assembly and the structure on the opposite faces of the head and disc from that shown in Figure 4.

The inner member 22 is cut away on its outer face so as to provide a projecting lug 27 which is integral with the body portion of said inner section 22, see Figure 4. The outer section 23 has threaded passages 28, 28 in which are located adjusting screws 29, 29. Also extending through said outer section 23 is a passage containing a clamp screw 30. When it is desired to adjust this outer section circumferentially of the inner section, one of the screws 29 is backed off from the lug and the other rotated against the lug to effect angular adjustment between members 21 and 22 for shifting the outer section relative to the inner section after which the locking screw 30 is turned up and this will firmly hold the inner and outer sections in adjusted position.

An indexing disc 31 is attached to the inner section 22 by means of a bolt 32. The bolt 32 has an enlarged portion 33 and a reduced threaded portion 34 and a head 35. The purpose of this bolt 32 is to hold the parts in assembled position but the opening 36 for the bolt is larger than the diameter of the enlarged shank portion 33 of the bolt and this will permit the disc to move bodily to the extent of the space between the wall of the opening and the enlarged portion of the bolt.

The outer section 23 is provided with diametrically arranged recesses 37, 37 and the inner face of the indexing disc 31 has ribs 38, 38 which engage these recesses and prevent the indexing disc 31 from turning circumferentially relative to the outer and inner sections 22 and 23, but permits the disc 31 to bodily shift on the ribs 38, 38 to a limited extent as above stated. This device is similar in construction to a flexible coupling.

On the outer face of the indexing disc 31 are radial recesses diametrically opposed to each other and mounted in one of the recesses is a sliding member 39 and mounted in the other recess is a slide 40. The slides are of the same thickness and each carries an extension 38ª and 38ª, see Figure 2. These extensions overlap and have an opening therethrough, through which the enlarged shank 33 of the bolt 32 passes. There is also a space between the ends of these extensions on the opposed slides 39 and 40 so that each slide may move radially in its recess to an extent limited by the space between the wall of the opening through the extensions and the enlarged portion 33 of the bolt 32. Mounted on the sliding member 39 is a pin 41 and mounted on the sliding member 40 is a pin 42. The ends of these pins are beveled and crowned as indicated at 43. The crown reduces friction between pin 42 and crank flange 45 during automatic loading of a crank into the machine.

The pin 41 is adapted to engage an aperture 44 extending through the flanged head 45 on the end of the crank shaft 1. The pin 42 is adapted to engage the aperture 46 extending through the flanged head 45. The pins 41 and 42 may shift independently of each other.

Let us assume that the apertures 44 and/or 46 are improperly positioned on the flanged head 45 of the crank shaft. If they are too far out from the center to freely receive the indexing pins 41 and 42, the tapered end of the pins will enter the apertures if the apertures are not too far off from correct positioning and this will cause the pins to move the slides on which they are mounted outwardly until the pins are centered relative to the aperture so that they can enter the same.

Let us assume that the pins are radially correctly positioned but that they are slightly out of line laterally of the longitudinal center lines of the slides. In such a case then the tapered end of the pins will enter the apertures and will force the indexing disc laterally on its connection to the member 23. This will bring the pins into proper alignment with the apertures so that they readily enter the same. If the pins are improperly positioned both radially and laterally then the tapered end of the pins will force the pins to a proper radial position and will force the pins and indexing disc 31 laterally so that regardless of the improper positioning of the apertures in any direction the pins will be shifted to bring about alignment with the apertures.

This shifting of the pins is limited to accommodate or compensate improper positioning of the apertures to a limited extent. Within the limits of adjustment referred to the crank shaft can be properly clamped in its bearings and the crank pins positioned for proper grinding. If the apertures are outside of the limits referred to above then the crank shaft must be discarded or the position of the aperture corrected. After the pins have moved into the apertures in the flanged head of the crank shaft then the crank shaft is clamped in its bearings and a selected crank pin will be properly positioned relative to the axis of rotation of the head and tail stocks so that grinding of the pin can be obtained. The correct position of the selected crank pin for a grinding operation is determined by a plunger 47 which enters a recess 48 formed in an index plate 49 rigidly connected to the indexing shaft 20. There are four of these indexing recesses when a four crank pin shaft is being ground.

As shown in Figure 1 the plunger 47 has moved into one of the recesses 48 and this will position the indexing shaft so that through the indexing pins carried thereby the shaft will be positioned properly for the grinding of a crank pin, that is, the axis of the crank pin will be in alignment with the axis of the rotating head stock. This plunger 47 and its function is similar to an indexing plunger shown in the Patent 2,651,895 supra. The plunger is spring pressed into the recess and may be withdrawn by hand or by hydraulic means.

After a pin has been ground and it is desired to index the crank shaft for positioning another pin for grinding, the clamps which hold the crank shaft are released so that the crank may be turned about its axis. This does not entirely release the crank as the indexing pins 41 and 42 are still in engagement with the flanged head on the crank shaft. The plunger 47 is retracted and then the indexing shaft is turned and as it is turned it operates through the pins 41 and 42 for rotating the crank shaft to bring the next pin for grinding into alignment with the axis of the head stock. When it is properly positioned in alignment the plunger 47 will drop into the recess 48 for locking the indexing shaft or plate in a set position. The clamps associated with the bearings are then closed and the machine is ready for grinding the next crank pin. This indexing continues until all the crank pins are ground. The grinding wheel is mounted in the usual way and moves toward and from the crank pin. The work is shifted axially from one crank pin to another for the grinding of the same.

It is obvious that minor changes in the details of construction may be made without departing from the spirit of the invention set forth in the appended claims.

I claim:

1. A machine for grinding the pins of a crank shaft comprising a head stock and a tail stock having spindles rotatably mounted therein, bearings carried by said spindles for supporting the crank shaft, means for clamping the crank shaft in said bearings, said bearings being disposed so that the axis of the crank shaft will be spaced radially from the axis of rotation of the spindles the same distance as the axes of the crank pins are spaced from the axis of the crank shaft, an indexing mechanism mounted in one of said spindles including an indexing shaft in axial alignment with the axis of the crank shaft, a locating pin carried by said indexing shaft and adapted to enter an aperture in the flanged end of the crank shaft for locating the same, and means for supporting said pin whereby the pin may shift to a limited extent for alignment with the aperture in said crank shaft.

2. A machine for grinding the pins of a crank shaft comprising a head stock and a tail stock having spindles rotatably mounted therein, bearings carried by said spindles for supporting the crank shaft, means for clamping the crank shaft in said bearings, said bearings being disposed so that the axis of the crank shaft will be spaced radially from the axis of rotation of the spindles the same distance as the axes of the crank pins are spaced from the axis of the crank shaft, an indexing mechanism mounted in one of said spindles including an indexing shaft in axial alignment with the axis of the crank shaft, locating pins carried by said indexing shaft and adapted to enter apertures in the flanged end of the crank shaft for locating the same, and means for supporting said pins whereby the pins may shift to a limited extent for alignment with the apertures in said crank shaft, said pins having tapered end portions whereby said tapered portions entering said respective apertures will force the pins laterally into axial alignment with the apertures.

3. A machine for grinding the pins of a crank shaft comprising a head stock and a tail stock having spindles rotatably mounted therein, bearings carried by said spindles for supporting the crank shaft, means for clamping the crank shaft in said bearings, said bearings being disposed so that the axis of the crank shaft will be spaced radially from the axis of rotation of the spindles the same distance as the axes of the crank pins are spaced from the axis of the crank shaft, an indexing mechanism mounted in one of said spindles including an indexing shaft in axial alignment with the axis of the crank shaft, said indexing shaft having a head on the end thereof, an indexing disc supported thereon and shiftable diametrically of said head to a limited extent, slides carried by said disc and independently shiftable radially thereof for a limited extent at right angles to the direction of shift of the disc and a locating pin carried by each slide adapted to engage locating apertures in the flanged end of the crank shaft, said pins having tapered end portions whereby said tapered portions entering the respective apertures will force the pins laterally into axial alignment with the apertures.

4. A machine for grinding the pins of a crank shaft comprising a head stock and a tail stock having spindles rotatably mounted therein, bearings carried by said spindles for supporting the crank shaft, means for clamping the crank shaft in said bearings, said bearings being disposed so that the axis of the crank shaft will be spaced radially from the axis of rotation of the spindles the same distance as the axes of the crank pins are spaced from the axis of the crank shaft, an indexing mechanism mounted in one of said spindles including an indexing shaft in axial alignment with the axis of the crank shaft, said indexing shaft having a head on the end thereof including an inner member connected to the end of the shaft and an outer member mounted on said inner member and adjustable circumferentially thereof, an indexing disc supported thereon and shiftable diametrically of said head to a limited extent, slides carried by said disc and independently shiftable radially thereof for a limited extent at right angles to the direction of shift of the disc and a locating pin carried by each slide adapted to engage locating apertures in the flanged end of the crank shaft, said pin having tapered end portions whereby said tapered portions entering the respective apertures will force the pins laterally into axial alignment with the apertures.

5. A machine for grinding the pins of a crank shaft comprising a head stock and a tail stock having spindles rotatably mounted therein, bearings carried by said spindles for supporting the crank shaft, means for clamping the crank shaft in said bearings, said bearings being disposed so that the axis of the crank shaft will be spaced radially from the axis of rotation of the spindles the same distance as the axes of the crank pins are spaced from the axis of the crank shaft, an indexing mechanism mounted in one of said spindles including an indexing shaft in axial alignment with the axis of the crank shaft, locating pins carried by said indexing shaft and adapted to enter apertures in the flanged end of the crank shaft for locating the same, and means for supporting said pins whereby the pins may shift to a limited extent for alignment with the apertures in said crank shaft, said indexing shaft having fixed thereto a locking member provided with recesses angularly spaced the same distance as the crank pins and a plunger adapted to enter one of the recesses for positioning and holding a crank pin in position for grinding.

6. A machine for grinding the pins of a crank shaft comprising a head stock and a tail stock having spindles rotatably mounted therein, bearings mounted on said spindles for supporting a crank shaft, means for clamping the crank shaft in said bearings, an indexing plate rotatably mounted on one of said clamping means in axial alignment with the axis of the crank shaft placed in said bearings, a locating pin, carried by said indexing plate and adapted to enter an aperture in the flanged end of the crank shaft for locating said shaft with a crank pin in axial alignment with said spindles, and means for supporting said pin whereby it is free to shift to a limited extent for alignment with the aperture in said crank shaft.

7. A machine for grinding the pins of a crank shaft comprising a head stock and a tail stock having spindles rotatably mounted therein, bearings mounted on said spindles for supporting a crank shaft, means for clamping the crank shaft in said bearings, an indexing plate rotatably mounted on one of said clamping means in axial alignment with the axis of the crank shaft placed in said bearings, a locating pin, carried by said indexing plate and adapted to enter an aperture in the flanged end of the crank shaft for locating said shaft with a crank pin in axial alignment with said spindles, and means for supporting said pin whereby it is free to shift to a limited extent in any direction in a vertical plane.

8. In a crank grinding machine, a clamping fixture having means for clamping a crank shaft eccentrically for rotation about the axis of a crank pin therein, means for angularly locating a crank shaft in said clamp including a member rotatably mounted in said fixture and having relatively slidable portions movable radially with respect to one another, a locating pin in one of said portions and extending therefrom to engage an aperture in the flanged end of a crank shaft, a fastening device extending through said relatively sliding portions and having a threaded connection in said first portion, said fastening device being substantially smaller in diameter than the holes through which it passes in said sliding portions whereby said portions may move to the extent of the differences in diameter of said holes and said fastening device to compensate for misalignment of said pin with the aperture in said work piece.

9. In a machine for grinding the pins of a crank shaft, a head stock and a tail stock having spindles rotatably mounted therein, bearings mounted on said spindles for supporting a crank shaft in offset relation to the axes of said spindles, means for clamping the crank shaft in said bearings, means for rotating said crank shaft in said bearings for indexing including an indexing plate rotatably mounted on one of said clamping means and also offset from the axes of said spindles, a locating pin carried by said indexing plate for engaging an aperture in the flange end of a crank shaft for locating said shaft angularly in said fixture, said indexing plate including a flexible coupling to permit said pin to compensate for slight errors in the position of said aperture.

References Cited in the file of this patent

UNITED STATES PATENTS

| | | |
|---|---|---|
| 1,244,533 | Morse | Oct. 30, 1917 |
| 2,651,895 | Rocks | Sept. 15, 1953 |

FOREIGN PATENTS

| | | |
|---|---|---|
| 626,942 | Great Britain | July 25, 1949 |